(12) United States Patent
Chand et al.

(10) Patent No.: US 7,739,142 B2
(45) Date of Patent: Jun. 15, 2010

(54) SYSTEM AND METHOD FOR PROVIDING AUTOMOBILE MARKETING RESEARCH INFORMATION

(75) Inventors: Jagdish Chand, Santa Clara, CA (US); Larry Weyer, San Francisco, CA (US); Ken Mallon, Los Altos, CA (US); Kay Pham, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1640 days.

(21) Appl. No.: 10/847,838

(22) Filed: May 17, 2004

(65) Prior Publication Data
US 2005/0256755 A1 Nov. 17, 2005

(51) Int. Cl.
G06F 17/30 (2006.01)
(52) U.S. Cl. ........................................... 705/10
(58) Field of Classification Search ............... 705/10
See application file for complete search history.

(56) References Cited

U.S. PATENT DOCUMENTS

| | | | |
|---|---|---|---|
| 5,062,074 A | 10/1991 | Kleinberger et al. | |
| 5,832,497 A | 11/1998 | Taylor | |
| 5,855,008 A * | 12/1998 | Goldhaber et al. | 705/14 |
| 5,931,907 A | 8/1999 | Davies et al. | |
| 6,006,225 A | 12/1999 | Bowman et al. | |
| 6,026,388 A | 2/2000 | Liddy et al. | |
| 6,052,122 A | 4/2000 | Sutcliffe et al. | |
| 6,144,944 A | 11/2000 | Kurtzman, II et al. | |
| 6,144,958 A | 11/2000 | Ortega | |
| 6,169,986 B1 | 1/2001 | Bowman et al. | |
| 6,185,558 B1 | 2/2001 | Bowman et al. | |
| 6,247,043 B1 | 6/2001 | Bates et al. | |
| 6,263,355 B1 | 7/2001 | Harrell et al. | |
| 6,304,864 B1 | 10/2001 | Liddy et al. | |
| 6,401,084 B1 | 6/2002 | Ortega et al. | |
| 6,434,551 B1 | 8/2002 | Takahashi et al. | |
| 6,453,312 B1 | 9/2002 | Goiffon et al. | |
| 6,460,036 B1 | 10/2002 | Herz | |
| 6,502,065 B2 | 12/2002 | Imanaka et al. | |
| 6,516,312 B1 | 2/2003 | Kraft et al. | |
| 6,564,213 B1 | 5/2003 | Ortega et al. | |
| 6,615,209 B1 | 9/2003 | Gomes et al. | |
| 6,658,423 B1 | 12/2003 | Pugh et al. | |
| 6,678,690 B2 | 1/2004 | Kobayashi et al. | |
| 6,681,247 B1 | 1/2004 | Payton | |
| 6,697,800 B1 | 2/2004 | Jannink et al. | |
| 6,782,370 B1 | 8/2004 | Stack | |
| 6,839,680 B1 * | 1/2005 | Liu et al. | 705/10 |

(Continued)

FOREIGN PATENT DOCUMENTS

WO WO 0146870 6/2001

OTHER PUBLICATIONS

Dialog file 275, Accession No. 01251109.*

(Continued)

*Primary Examiner*—Romain Jeanty

(57) ABSTRACT

A system and method for providing customized reports regarding pre-sale auto interest is enclosed herein. The reports are configured to provide pre-sale marketing research information about potential shoppers of particular auto models. The reports are also configured to provide information about competitors' auto models. The reports are also configured to provide demographic and interest information of the potential shoppers of the particular auto models.

20 Claims, 9 Drawing Sheets

U.S. PATENT DOCUMENTS

| | | | |
|---|---|---|---|
| 6,853,982 | B2 | 2/2005 | Smith et al. |
| 6,853,993 | B2 | 2/2005 | Ortega |
| 6,873,996 | B2 | 3/2005 | Chand |
| 6,912,505 | B2 | 6/2005 | Linden et al. |
| 6,963,867 | B2 | 11/2005 | Ford et al. |
| 7,043,433 | B2 | 5/2006 | Hejna, Jr. |
| 7,076,483 | B2 | 7/2006 | Preda et al. |
| 7,089,237 | B2 | 8/2006 | Turnbull et al. |
| 7,124,353 | B2 | 10/2006 | Goodwin et al. |
| 7,146,416 | B1 | 12/2006 | Yoo et al. |
| 7,225,187 | B2 | 5/2007 | Dumais et al. |
| 7,249,121 | B1 | 7/2007 | Bharat et al. |
| 7,406,436 | B1* | 7/2008 | Reisman ............ 705/10 |
| 7,424,469 | B2 | 9/2008 | Ratnaparkhi |
| 2002/0038241 | A1 | 3/2002 | Hiraga |
| 2002/0042736 | A1* | 4/2002 | Wang et al. ......... 705/10 |
| 2002/0194161 | A1 | 12/2002 | McNamee et al. |
| 2002/0194166 | A1 | 12/2002 | Fowler |
| 2002/0198882 | A1 | 12/2002 | Linden et al. |
| 2003/0018621 | A1 | 1/2003 | Steiner et al. |
| 2003/0046389 | A1 | 3/2003 | Thieme |
| 2003/0088525 | A1 | 5/2003 | Velez et al. |
| 2003/0135379 | A1* | 7/2003 | Schirmer et al. ........ 705/1 |
| 2003/0195877 | A1 | 10/2003 | Ford et al. |
| 2004/0117189 | A1 | 6/2004 | Bennett |
| 2004/0210565 | A1 | 10/2004 | Lu |
| 2004/0210600 | A1 | 10/2004 | Chand |
| 2004/0225629 | A1 | 11/2004 | Eder |
| 2005/0080764 | A1 | 4/2005 | Ito |
| 2005/0083906 | A1 | 4/2005 | Speicher |
| 2005/0192955 | A1 | 9/2005 | Farrell |

OTHER PUBLICATIONS

Miller (Deal enables GM to track Web use for ad pitches), Jan. 2000 Automaker vol. 74, p. 1.*

Minwen Ji (Nov. 2002). "Affinity-Based Management of Main Memory Database Clusters," AMC Transactions on Internet Technology, 2(4):307-339.

Donath, J. S. et al. "The Sociable Web," located at <http://web.web.archive.org/web/19980216205524/http://judith.www.media> visited on Aug. 14, 2003. (4 pages).

Yi Liu et al. (May 2004). "Affinity Rank: A New Scheme for Efficient Web Search," AMC 1-58113-912-8/04/0005, pp. 338-339.

M. Balabanovic et al., "Content-Based, Collaborative Recommendation", Communications of the ACM vol. 40, No. 3, Mar. 1988, pp. 66-72.

H. Kawano et al., "Mondou: Web search engine with textual data mining", 0-7803-3905, IEEE, Mar. 1997, pp. 402-405.

M. Tanaka et al., "Intelligent System for Topic Survey in Medline by Keyword Recommendation and Learning Text Characteristics", Genome Informatics 11: 73-82, 2000, pp. 73-82.

Pending U.S. Appl. No. 10/417,709, files Apr. 16, 2003, Chand.

Gale Group, "Cars Online 25% or More of U.S. Car Sales Will Start on the Internet by Year 2000 (The number of people using the Internet to look up information on automobiles increased from 5 mil in 1995 to 13.2 mil in 1996)"; InterActive Consumers, vol. 4, No. 2, p. 1+, Feb. 1997.

Anonymous. (2006). "Key" Oxford English Dictionary Online, located at <http://dictionary.oed.com>, last accessed on Sep. 23, 2006, thirty-four pages.

Calishain, T. et al. (Feb. 2003). "Google Hacks" First Printing, pp. 18-24, 33, 288-289, 293-297.

Dialog Chronolog. (Sep. 1998). "New Features on DialogWeb™," two pages.

Dialog Information Services. (Jan. 1992). "DialogOnDisc Users Guide," Version 4.0 for DOS, pp. v1, (c), 2-1, 2-2, 3-4, 3-5, 3-9, 3-10, 3-11, 3-15, 3-17, 3-19, 3-21, 4-11, 4-21, 4-22, 4-27, 5-2, 5-7, 5-8, 5-9, 5-10, 5-11, c-2.

Dialog Information Services. (May 1995). "DialogLink for the Windows™ Operating System User's Guide," Version 2.1 pp, 1-2, 1-3, 4-1, 4-2, 5-2, 5-3.

DialogLink, "DialogLink for Windows and Machintosh: User's Guide", Dec. 1993, Version 2.01, P. (cover sheet), (3-11).

dictionary.oed.com, "Oxford English Dictionary", 1989-1997, Retrieved Sep. 23, 2006, 2nd Ed. 34 pages.

Genova, Z. et al. (Nov. 2002). "Efficient Summarization of URLs using CRC32 for Implementing URL Switching," Proceedings of the 27th Annual IEEE Conference on Local Computer Networks LCN'02, two pages.

Hammami, M. et al. (Oct. 2003). "Webguard: Web Based Adult Content and Filtering System," Proceedings of the IEEE/WIC Conference on Web Intelligence (WI'03), five pages.

Lam-Adesina, A.M. et al. (Sep. 9, 2001). "Applying Summarization Techniques for Term Selection in Relevance Feedback," SIGIR'01, ACM Press, nine pages.

Merriam-Webster.com, "Merriam Webster Thesaurus," located at <http://web.archive.org/web/20030204132348http://www.m-w.com>, visited on Feb. 4, 2003, seven pages.

Netcraft, Site Report for "www.dialoweb.com," (May 10, 1998). located at <http://toolbar.netcraft.com/site_report?url=http://www.dialogweb.com> last visited on Sep. 27, 2006, one page.

oed.com "Definition of prescribed," Dec. 2003, Retrieved Mar. 3, 2008, located at <http//dictornary.oed.com/cgi/ent . . . >, two pages.

Salton, G. (1986). "Abstracts of Articles in the Information Retrieval Area Selected by Gerald Salton," ACM Portal: 39-50.

Sherman, C. (Aug. 23, 2005). "Google Power, Unleash the Full Potential of Google," McGraw-Hill/Osborne, pp. 42-47, 77, 80-81, 100-107, 238-239, 421-422.

Sugiura, A. et al. (Jun. 2000). "Query Routing for Web search engines: Architecture and Experiments," Computer Networks 2000, pp. 417-429, located at www.elsevier.com/locate/comnet.

Thomson Dialog. (2003). "DialogWeb Command Search Tutorial," Dialog Web Version 2.0, located at <http://support.dialog.com/techdocs/dialogweb_command_tutorial.pdf#search=%22dialogweb %202002%22> last visited on Dec. 10, 2002, twenty-three pages.

Thomson Products, Extrinsic Evidence of the Common Ownership and Distribution of DialogWeb & DialogOnDisc, located at <http://dialog.com/contacts/forms/member.shtml>, <http://www.dialog.com/products/platform/webinterface.shtml>, and <http://www.dialog.com/products/platform/desktop_app.shtml>, last visited on Sep. 27, 2006, three pages.

* cited by examiner

AUTO SHOPPER    DEMOGRAPHICS    INTERESTS

PRIMARY VEHICLES: EXPLORER 4-DOOR
2ND & 3RD VEHICLES: 4RUNNER AND MDX    MAY '03 – MONTHLY

| MUSIC | SPORTS | TV | TRAVEL |

SPORTS

| RANK | EXPLORER 4-DOOR | 4RUNNER | MDX |
|---|---|---|---|
| 1. | ESPN | ESPN | ESPN |
| 2. | NFL.COM | NFL.COM | NFL.COM |
| 3. | NATIONAL FOOTBALL LEAGUE | NATIONAL FOOTBALL LEAGUE | NATIONAL FOOTBALL LEAGUE |
| 4. | ESCALADE | NBA | SNOWBOARDS |
| 5. | NBA | CABELLAS | NBA |
| 6. | SPORTS AUTHORITY | SPORTS AUTHORITY | SPORTS |
| 7. | NBA.COM | NBA.COM | SKI |
| 8. | CABELLAS | GUNS | SPORTS AUTHORITY |
| 9. | WWE | WWE | CABELLAS |
| 10. | SNOWBOARDS | BOATS | DICKS SPORTING GOODS |
|  |  |  | SHOW TOP 100 |

FIG. 8

PRIMARY VEHICLE: GMC TRUCK

OCTOBER 2002 | NOVEMBER 2002

| TOP 15 AUTOS AFFINITIES ||||
|---|---|---|---|
| RANK | TERM | AFFINITY | INDEX |
| 1 | HONDA PILOT | 21.6% | 4.4 |
| 2 | CHEVROLET TRAILBLAZER | 20.7% | 11.4 |
| 3 | GMC ENVOY XL | 20.1% | 25.1 |
| 4 | TOYOTA HIGHLANDER | 18.3% | 6.7 |
| 5 | JEEP GRAND CHEROKEE | 15.0% | 5.2 |
| 6 | CHEVROLET BLAZER | 14.8% | 8.1 |
| 7 | HUMMER H2 | 14.4% | 2.0 |
| 8 | DODGE DURANGO | 14.4% | 9.2 |
| 9 | GMC YUKON | 14.0% | 16.4 |
| 10 | ACURA MDX | 13.7% | 5.6 |
| 11 | CHEVROLET ALL NEW TRAILBLAZER | 13.7% | 12.7 |
| 12 | CHEVROLET TAHOE | 12.3% | 6.8 |
| 13 | JEEP LIBERTY | 12.2% | 2.6 |
| 14 | TOYOTA SEQUOIA | 11.9% | 6.0 |
| 15 | MITSUBISHI MONTERO SPORT | 11.2% | 6.6 |
| SHOW TOP 100 AUTOS AFFINITIES ||||

| TOP 15 AUTOS AFFINITIES ||||
|---|---|---|---|
| RANK | TERM | AFFINITY | INDEX |
| 1 | HONDA PILOT | 21.8% | 4.8 |
| 2 | CHEVROLET TRAILBLAZER | 20.1% | 12.0 |
| 3 | GMC ENVOY XL | 18.0% | 27.9 |
| 4 | TOYOTA HIGHLANDER | 16.0% | 6.5 |
| 5 | JEEP GRAND CHEROKEE | 14.7% | 5.1 |
| 6 | GMC YUKON | 14.3% | 18.2 |
| 7 | CHEVROLET BLAZER | 13.6% | 8.6 |
| 8 | DODGE DURANGO | 13.0% | 9.9 |
| 9 | TOYOTA 4RUNNER | 12.9% | 5.9 |
| 10 | CHEVROLET TAHOE | 12.2% | 6.6 |
| 11 | HUMMER H2 | 12.0% | 2.0 |
| 12 | TOYOTA SEQUOIA | 11.6% | 6.1 |
| 13 | CHEVROLET ALL NEW TRAILBLAZER | 11.5% | 15.5 |
| 14 | ACURA MDX | 11.5% | 5.1 |
| 15 | MITSUBISHI MONTERO SPORT | 10.8% | 7.2 |
| SHOW TOP 100 AUTOS AFFINITIES ||||

FIG. 9a

DECEMBER 2002

TOP 15 AUTOS AFFINITIES

| RANK | TERM | AFFINITY | INDEX |
|---|---|---|---|
| 1 | HONDA PILOT | 23.1% | 4.7 |
| 2 | CHEVROLET TRAILBLAZER | 21.7% | 12.9 |
| 3 | GMC ENVOY XL | 17.1% | 26.1 |
| 4 | TOYOTA HIGHLANDER | 15.8% | 6.6 |
| 5 | TOYOTA 4RUNNER | 15.7% | 5.5 |
| 6 | JEEP GRAND CHEROKEE | 15.1% | 5.5 |
| 7 | CHEVROLET BLAZER | 13.2% | 9.4 |
| 8 | DODGE DURANGO | 12.7% | 10.2 |
| 9 | HUMMER H2 | 12.7% | 2.1 |
| 10 | GMC YUKON | 12.6% | 16.1 |
| 11 | CHEVROLET TAHOE | 11.4% | 6.8 |
| 12 | ACRUA MDX | 11.3% | 4.9 |
| 13 | NISSAN PATHFINDER | 10.4% | 7.4 |
| 14 | LINCOLN AVIATOR | 10.0% | 5.0 |
| 15 | JEEP LIBERTY | 9.7% | 3.7 |

SHOW TOP 100 AUTOS AFFINITIES

FIG. 9b

FROM FIG. 9a

SYSTEM AND METHOD FOR PROVIDING AUTOMOBILE MARKETING RESEARCH INFORMATION

BACKGROUND OF THE INVENTION

The present invention relates to a computer-implemented system for providing marketing research information. More particularly, the present invention relates to providing automobile interest marketing research.

Bringing an automobile model to market is a significant investment for an automobile manufacturer. Typically, each auto model is designed, equipped, priced, and marketed with a target consumer in mind. The target consumer may be a hypothetical person or persons having certain characteristics, such as the same gender, age range, income bracket, cargo requirements, etc. Each auto model may have a different target consumer.

Once a particular auto model has been purchased, the actual target consumer is known. This consumer can then be surveyed or otherwise analyzed to determine the identifying characteristics and fit with the purchased auto. Presently, a number of such compiled information exists, such as the J.D. Powers and Associates customer satisfaction survey. Hence, post-sale data regarding purchasers of autos (e.g., post-sale marketing data) are readily available.

In contrast, pre-sale marketing data is scarce. Obtaining information about persons expressing interest in a particular auto model, other auto models of interest to the persons (e.g., competitor's auto models and/or different equipment options of a single model), and other activities of interest to the persons would be valuable to auto manufacturers. Actual persons expressing interest in a particular model may be different from the auto manufacturer's targeted consumer. Competitors' models of interest relative to a particular auto model may be different from what the auto manufacturer assumed. Alternatively, a particular auto model may appeal to a certain group but the auto manufacturer is unsure of why the model appeals to this group.

Hence, pre-sale data provides valuable information to auto manufacturers and its affiliates (e.g., advertising agencies) to better tailor a particular auto model to the most likely target consumers. Pre-sale data may also provide relevant data points for tailoring a particular auto model to more than one target consumer type. Pre-sale data may also be helpful in future modifications of the auto model or other auto models.

BRIEF SUMMARY OF THE INVENTION

In one embodiment of the invention, a computer implemented method generates information on peoples' interest in different types of automobiles. The method includes monitoring computer user navigation of a multiplicity of users to identify indications of interest in specific automobile models by such monitored users, and producing affinity data that indicate measures of respective paired associations between respective pairs of specific automobile models based upon their both having been indicated to be of interest by at least a prescribed number of monitored users. The method further includes monitoring computer user searches of a multiplicity of users to identify categories of information of interest to the monitored users, correlating categories of information with identified indications of interest in specific automobile models, and obtaining demographic information concerning the multiplicity of monitored users. The method also further includes correlating demographic information with identified indications of interest in specific automobile models, and receiving a user request for market information about at least one automobile model identified by a user making the request. The method uses the affinity data to generate a measure of paired association between the at least one user identified automobile model and at least one other automobile model. The method uses the correlated categories to identify at least one category correlated with the at least one user identified automobile model. The method uses the correlated demographic information to identify demographic information correlated with the at least one user identified automobile model.

In another embodiment of the invention, a system generates information on peoples' interest in different automobile models. The system includes means for monitoring computer use of a plurality of users to identify indication of interest in specific automobile models by such monitored users, and means for monitoring computer user searches by the monitored users to identify categories of information of interest to the monitored users. The system further includes means for obtaining demographic information concerning the monitored users, and means for generating affinity data, demographic data, and interest data from the identified indications of interest in specific automobile models, identified categories of information of interest, and demographic information. The system still further includes means for requesting automobile insight information about at least one automobile model, wherein the at least one automobile model is specified by a user interfacing with the means for requesting.

In still another embodiment of the invention, an article of manufacture includes a first server, a device, and a database. The first server is configured to generate a measure of paired association between an at least one automobile model and at least one other automobile model, at least one category information relating to the at least one automobile model, and demographic information relating to the at least one automobile model. The device is in communication with the first server and is configured to receive a user request for market information about the at least one automobile model and to present the market information from the first server. The database is in communication with the first server and is configured to store affinity data indicative of measures of respective paired associations between respective pairs of specific automobile models based on both of the specific automobile models having been indicated as being of interest by at least a prescribed number of monitored users, at least one category information for each of the specific automobile models, and demographic information for each of the specific automobile models.

In another embodiment of the invention, a computer-readable medium contains data structure for use by a remotely located computing device. The data structure includes at least one record stored at a server computer comprising a specific automobile model identifier, a measure of paired association between an automobile model represented by the specific automobile model identifier and at least one other automobile model, at least one first category information for a first category correlated to the automobile model, and at least one demographic information correlated to the automobile model. The measure of paired association, at least one first category information, and at least one demographic information are obtained from monitoring a plurality of users at computing devices.

BRIEF DESCRIPTION OF THE DRAWINGS

The exemplary embodiments will become more fully understood from the following detailed description, taken in conjunction with the accompanying drawings, wherein like reference numerals denote like elements, in which:

FIG. 8 is a screenshot of yet another page of the customized auto insight report of FIG. 6.

FIG. 9 is a screenshot of still another page of the customized auto insight report of FIG. 6.

Figure 1:
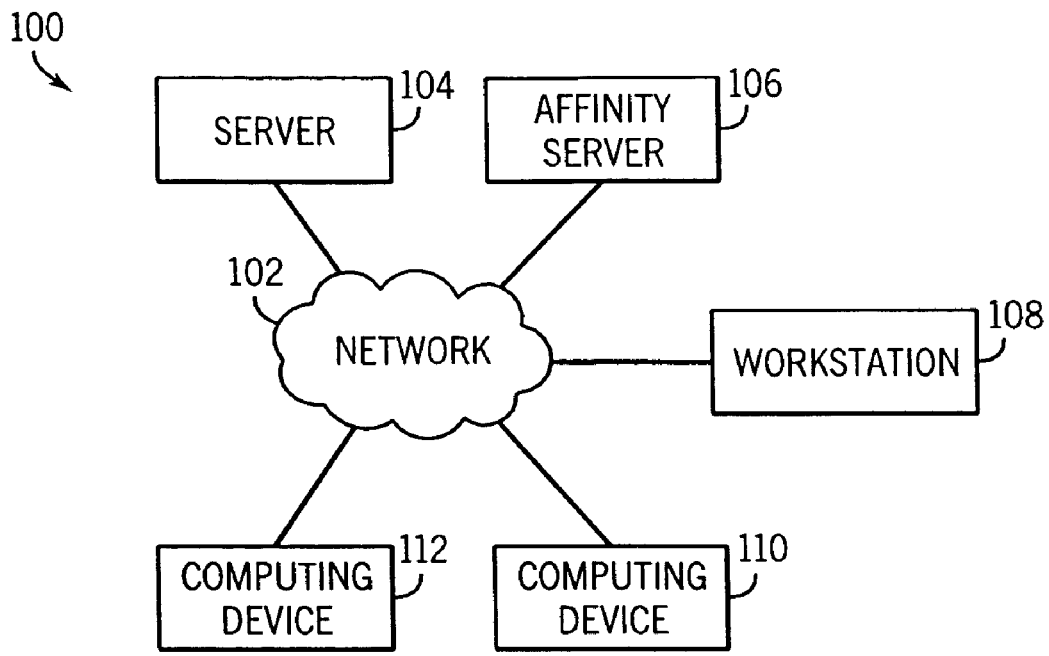
FIG. 1 is a block diagram of one embodiment of an auto insight report system.

In the drawings, to easily identify the discussion of any particular element or part, the most significant digit or digits in a reference number refer to the figure number in which that element is first introduced (e.g., element 1104 is first introduced and discussed with respect to FIG. 11).

The headings provided herein are for convenience only and do not necessarily affect the scope or meaning of the claimed invention.

DETAILED DESCRIPTION OF THE INVENTION

Described in detail below is a system and method for obtaining and presenting marketing data pertaining to potential shoppers of automobiles. In one embodiment, interest in each particular auto model by persons is identified. The demographic profile associated with each of the persons as well as other behavior and/or interests of the given person are stored and analyzed in an affinity algorithm or engine. The resulting affinity data are utilized to provide insight into the degree of interest by potential shoppers between different auto models, and the demographic and interest profiles of these potential shoppers.

Accordingly, the auto insight report identifies the degrees of common interest by a large number of people toward specific auto models. Subscribers of the auto insight report select the specific auto models to study. The auto insight report also provides profile data relating to this large number of people, so that more in-depth inferences as to why and in what way the specific auto models are of interest can be derived. And due to the nature in which the affinity data and auto insight reports are generated, the auto insight reports are customized and current per each subscriber's specifications.

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of the embodiments of the invention.

Referring to FIG. 1, a block diagram of one embodiment of an auto insight report generation system 100 is shown. The system 100 includes a network 102 in communication with each of a server 104, and affinity server 106, a workstation 108, a computing device 110, and a computing device 112. Each of the server 104, server 106, workstation 108, computing device 110, and computing device 112 is coupled to the network 102 via a wired or wireless connection.

The network 102 is a communication network, such as a local area network (LAN), a wide area network (WAN), or the Internet. When the network 102 is a public network, security features (e.g., VPN/SSL secure transport) may be included to ensure authorized access within the system 100.

The server 104 is configured to be a web host; store the session history of identified persons; store profile information of identified persons; and interact with the server 106. The server 104 is further configured to interface with the workstation 108 and each of the computing devices 110, 112 via the network 102. The server 104 provides web pages and content associated with an auto insight report site to each of the computing devices 110, 112. The server 104 serves as the intermediary between subscribers or users of the auto insight report site and the affinity data. The server 104 is also configured to provide websites, especially those comprising a network, for people to navigate on the computing devices 110, 112.

The server 106 is configured to provide an affinity engine or algorithm, and store the affinity data generated from the affinity engine. The affinity engine utilized in the server 106 can be an affinity engine as described in commonly owned U.S. patent application Ser. No. 10/417,709, filed Apr. 16, 2003, entitled "Affinity Analysis Method and Article of Manufacture," which is incorporated by reference herein in its entirety. Alternatively, other affinity engines or relationship analyses may be implemented. The servers 104 and 106 communicate with each other via the network 102.

The workstation 108, also referred to as a network operator workstation or administrative computer, is configured to access the server 104 or 106 for administrative purposes. For example, new or upgraded applications may be uploaded to the servers 104 and 106 from the workstation 108. Operational parameters and/or statistical information may also be gathered from the servers 104 and 106 and be provided to the workstation 108.

Each of the computing devices 110 and 112 is configured to present a variety of websites and/or provide the auto insight report site. The variety of websites, to be described in greater detail herein, may be websites to, for example, web portals, manufacturer product websites, on-line retailers, on-line phone directories, on-line mapping websites, search engines, etc. The auto insight report site, also to be described in greater detail herein, may be a subscription based website that authorized subscribers log into to access customized auto insight reports.

The variety of websites and the auto insight report site may be accessed at the same computing device or at different computing devices. Persons navigating through the variety of websites can be members of the general public. The computing devices 110 and 112 are remotely located from the serves 104 and 106 and the workstation 108.

Computing devices 110 and 112 may be a general purpose computer (e.g., a personal computer). Other computer system configurations, including Internet appliances, hand-held devices, wireless devices, portable devices, wearable computer, cellular or mobile phones, personal digital assistants (PDAs), multi-processor systems, microprocessor-based or programmable consumer electronics, set-top boxes, network PCs, mini-computers, and the like may also be implemented to practice aspects of the invention. Computing devices 110 and 112 include one or more applications, program modules, and/or subroutines. As an example, computing devices 110 and 112 may include an Internet web browser program. The system 100 may include more or less than two computing devices.

Although not shown, the servers 104 and 106 include one or more databases, processors, and other components or modules. Each of the servers 104 and 106 can comprise more than one server. It should also be understood that routers, switches, management components, etc., are present in the system 100 as a distributed computing environment. Other servers may also be included in the system 100, these servers configured to host one or more of the variety of websites.

Figure 2:
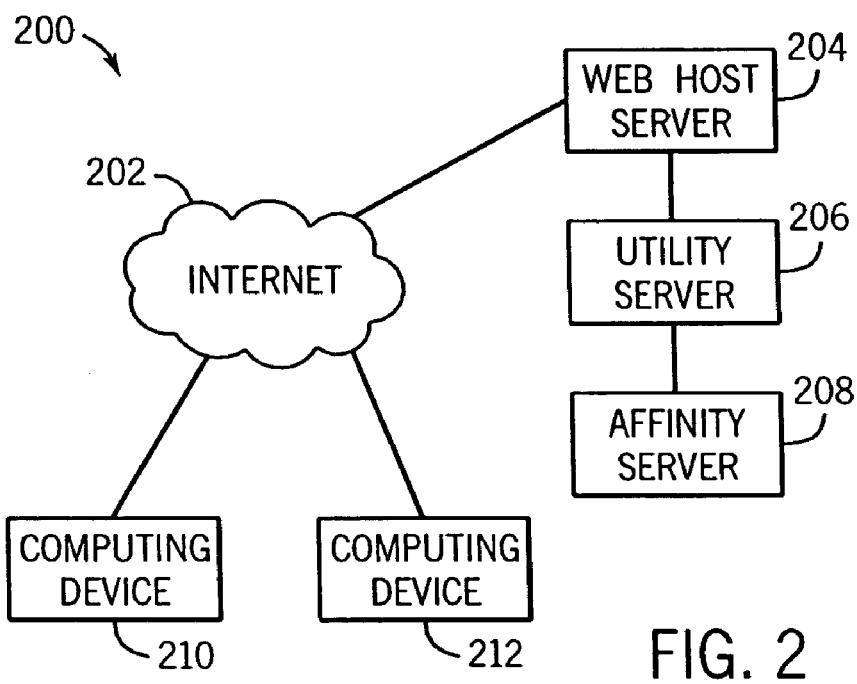
FIG. 2 is a block diagram of another embodiment of the auto insight report system of FIG. 1.

Referring to FIG. 2, an alternative embodiment of the system 100 is shown as a system 200. The system 200 includes the Internet 202, a web host server 204, a utility server 206, an affinity server 208, a computing device 210, and a computing device 212. Each of the web host server 204 and the affinity server 208 is coupled to the utility server 206. Each of the web host server 204, computing device 210, and computing device 212 is coupled to the Internet 202. The system 200 is configured to be an affinity server farm and feed system for auto insight reports.

The web host server 204 is a front-end web server configured to provide websites to the computing devices 210, 212 via the Internet 202. The web host server 204 is further configured to monitor web surfing or navigation activity by users of the computing devices 210, 212. The web host server 204 may also be configured to store such session history and user profile information for each user in one or more log files. The saved log files may be in PHP extension format.

The information compiled in the log files are served via a TCP/IP connection to the utility server 206. The utility server 206 aggregates and formats the log files into a format usable to the affinity server 208 and other computational servers (not shown). The utility server 206 may also perform computations using data from the log files and/or user profile information.

Inputs to the affinity server 208, and more particularly, to the affinity engine included in the affinity server 208, comprise affinity feed data, and the output comprises a set of affinity data (also referred to as an affinity data set) representative of a measure of association or frequency of togetherness between particular auto models by potential shoppers. The affinity data set are stored in the affinity server 208.

At the computing devices 210, 212, which are similar to the computing devices 110, 112, users may access websites hosted at the web host server 204 via the Internet 202. Certain users may also access the auto insight report site hosted at the web host server 204 via the Internet 202.

It is contemplated that more than one affinity server may be included in the system 200, to serve as backup or to handle the computational power required to generate the affinity data set. These may be provided a separate web host server to host the auto insight report site. The servers 204, 206, 208 may include databases and may be networked together with other network components.

Figure 3:
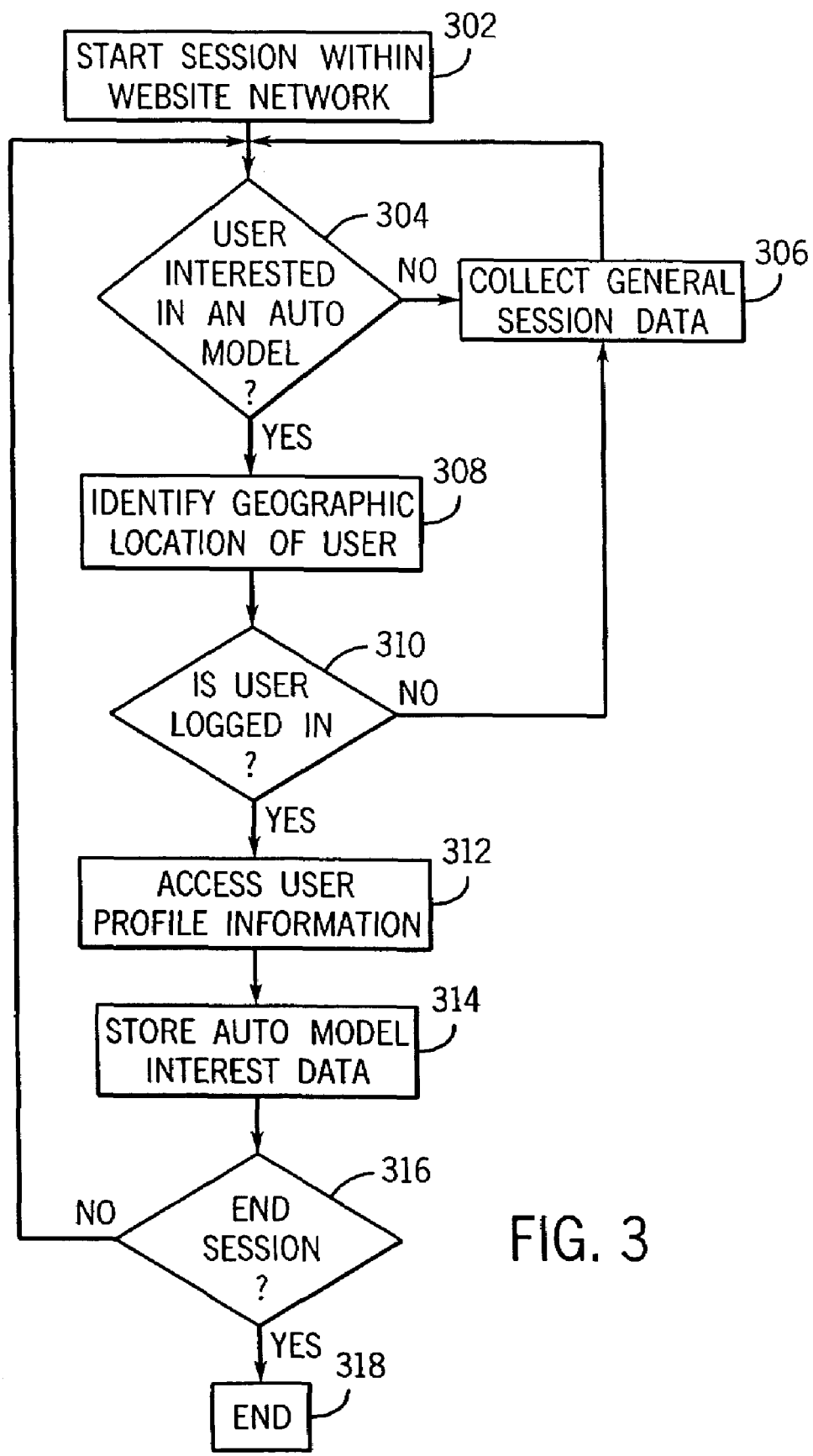
FIG. 3 is a flowchart illustrating collection of an auto model interest data using the systems of FIG. 1 or 2.

Referring to FIG. 3, a flowchart of one embodiment of a user session at a networked website is shown. The flowchart includes a start block 302, an interest inquiry block 304, a collect session data block 306, an identify geographic location block 308, a log in inquiry block 310, an access user profile information block 312, a save block 314, an end session inquiry block 316, and an end block 318.

At the start block 302, a user at a computing device (e.g., the computing device 110 or 210) accesses a website that is part of an associated websites or website network. A website network comprises two or more websites in which a registered user who has logged into a first networked website and then goes to a second networked website can be monitored as an identified user at both the first and second websites. As an example, the first website may be a portal including a search window and a list of other networked websites; and the second website may be an on-line phone directory that is one of the listed networked websites.

As the user navigates and interacts with the website, user activity is monitored in the block 304. In the block 304, the web host server looks to see whether the user may be a purchaser of a particular auto model by identifying or flagging the user's interest in a particular auto model. For example, if the user viewed information about the Ford Explorer 4 door on a Ford product website, ran a search for the Ford Explorer 4 door, or looked up a Ford Explorer 4 door dealership in an online phone directory (collectively, user navigation), any of these user activities would flag the user as being interested in the Ford Explorer 4 door.

If no triggering activity has occurred, then general session history data is collected in the block 306 and monitoring for a triggering activity continues. On the other hand, if the user has shown interest in a particular auto model, then the geographic location of the user is identified at the block 308. Geographic location may be obtained by the IP mapping associated with the computing device in use by the user.

Next, in order to collect demographic data and interest data, the web host-server looks to see whether the user is logged into the website network at the block 310. If the user is not logged in, then collection of general session data (e.g., websites visited) and then monitoring for interest in a particular auto model continues. If the user is logged in, then the user is registered with the web site network and is uniquely identifiable. Thus, user profile information associated with the user registration can be accessed at the block 312.

Next, at the block 314, the unique user identifier is saved as being interested in the Ford Explorer 4 door. Since the web host server knows beforehand all the possible auto models, a database for each different auto model can be configured with unique user identifiers being the data included within each of these databases. In other words, the systems 100 and 200 are configured to recognize interest in any auto model and uniquely identify the user showing the interest, if possible, to store such data for affinity analysis.

The interested auto model and corresponding user identifier data are accumulated over a set period of time, such as a month, two months, or three months. During this time period, a large number of registered users (e.g., approximately 300,000-1,000,000 users per month) may trigger the auto model interest flag and be added to the database(s). This data collectively referred to as auto model interest data or affinity feed data, may comprise a dual column data structure such as:

| User identifier | Auto model |
|---|---|
| User A | Ford Explorer 4 door |
| User Y | Honda Accord 4 door |
| User B | Toyota Camry |
| User A | Toyota 4 Runner |
| User Z | Ford Explorer 4 door |
| User X | Acura MDX |
| . | |
| . | |
| . | |

Alternatively, the auto interest model data may be organized by the different auto models. For example:

Ford Explorer 4 Door
User A
User Z
●
●

Honda Accord 4 Door
User Y
●
●

Toyota Camry
User B
●
●

Toyota 4 Runner
User A
●
●

Acura MDX
User X
●
●

The user can then end the current session at the website network (blocks 316 and 318), or continue navigating the website or another website within the network. In the latter case, monitoring for a triggering activity continues at the block 304.

It should be understood that one or more blocks may be carried out simultaneously, omitted, or be in different order. For example, the block 310 to check for whether user has logged in can be performed as soon as the session has started at the block 302. As another example, accessing the user profile information at the block 312 may be omitted if the log-in name already uniquely identifies the user.

Figure 4:
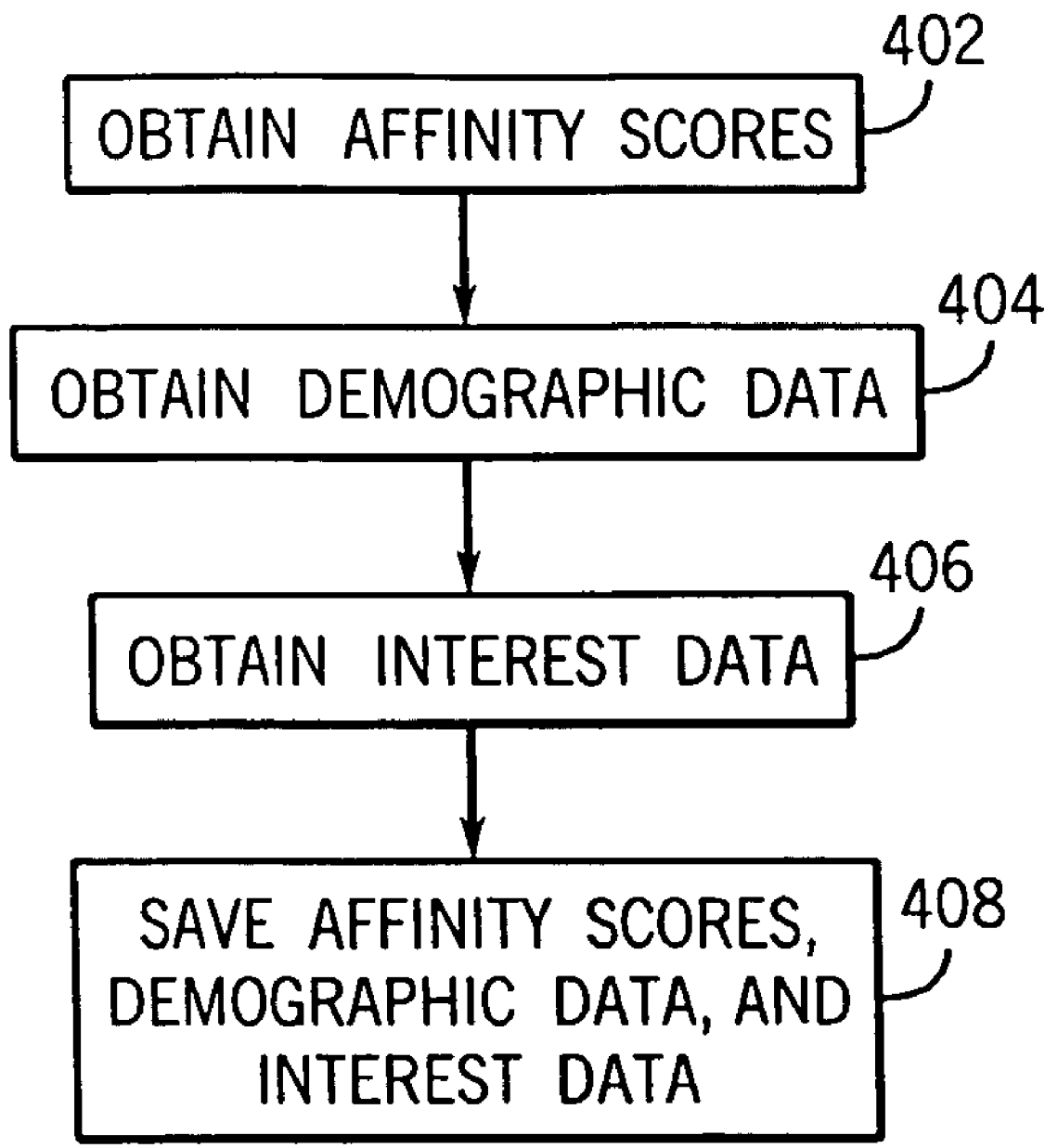
FIG. 4 is a flowchart illustrating generation of various data to configure an auto insight report.

Referring to FIG. 4, one embodiment of a flowchart showing data processing to generate an auto insight report is shown. The flowchart includes an obtain affinity scores block 402, an obtain demographic data block 404, an obtain interest data block 406, and a save data block 408.

At the block 402, the affinity feed data are provided to the affinity engine to output affinity scores comprising an affinity data set. The affinity data set is updated on a rolling month or quarterly basis in correspondence with the update to the affinity feed data. An affinity score is calculated for each pair of auto models (e.g., affinity (auto model A→auto model B)) and the reverse of each pair of models (e.g., affinity (auto model B→auto model A)). The affinity data set indicates measures of respective paired associations between respective pairs of specific automobile models, the respective pairs of specific automobile models having been indicated of being of interest by at least a prescribed number of users of the website network.

Each affinity score represents the likelihood that a shopper of one auto model will be a shopper of another auto model. In other words, an affinity score is representative of the amount of overlap between auto model A and B shoppers. The affinity scores can be expressed as:

Affinity($A \rightarrow B$)=100×(number of people shopping for both $A$ and $B$)/(number of people shopping for $A$)

Reverse Affinity($B \rightarrow A$)=100×(number of people shopping for both $A$ and $B$)/(number of people shopping for $B$).

For example, if Jeep Grand Cherokee shoppers have an affinity of 15% for the Ford Explorer, this means 15% of the consumers shopping for the Grand Cherokee are also shopping for the Explorer.

Next, at the block 404, demographic data or information associated with each auto model are obtained. From the auto model interest data, it is known the registered users that showed interest in a given auto model. By accessing the user profile or registration information for these registered users, a wealth of demographic type of data about these registered users becomes available. Then by collating the user profile information, the demographic data for a given auto model is generated. The demographic data includes, but is not limited to, gender, age, geographic location information, income brackets, etc.

To obtain interest data at the block 406, the auto interest data and past sessions data are used. The past sessions data comprise automatically saved data regarding past or historical sessions by registered users at the networked websites. Typically, the past sessions data covers the same time frame as the auto interest data.

When a registered and logged in user accesses networked websites, information regarding the user activity and navigation of the websites are saved. As an example, searches conducted by the logged in user are saved, including which search results or links the user clicked on from the search result webpage. Since each of the search results or links is pre-categorized as, for example, sports, movie, TV, travel, finance, etc., the past sessions data permit one or more particular categories (or also referred to as other interests of the users) to be flagged and specific URL addresses of those categories visited by the users are known.

Hence, for each identified user in the auto interest data for a given auto model, his/her past sessions data are retrieved. Then based on the categories of interest information, the specific search result links or URL addresses visited by the user that are of the same categories of interest are extracted to generate the interest data. An interest data set is generated for each auto model.

For example, the four interest categories can be music, sports, TV, politics, and travel. If an identified user (e.g., a registered and logged in user) ran a search for "Ford," search results would likely include "Ford auto," "Harrison Ford," "Gerald Ford," etc. "Ford auto" may be pre-categorized as automotive, "Harrison Ford" may be pre-categorized as entertainer, and "Gerald Ford" may be pre-categorized as politics. If the user clicks on "Gerald Ford," then the URL address associated with the "Gerald Ford" search result is a data point included in the interest data for the particular auto model(s) that the user also expressed an interest in.

Lastly, at the block 408, the affinity scores, demographic data, and interest data are saved at one or more servers within the system 100 or 200 as a master auto insight report for a given time frame. The master auto insight report can also include an index number for each auto model. The index number of a given auto model is the ratio between the actual affinity and the average affinity. For example, if the average affinity with auto model A across all auto models is 10%, and the (actual) affinity between auto model A and auto model B is 15%, then the index number for auto model A is 1.5 (since the actual affinity of 15% is 1.5 times larger than the average affinity of 10%).

Figure 5:
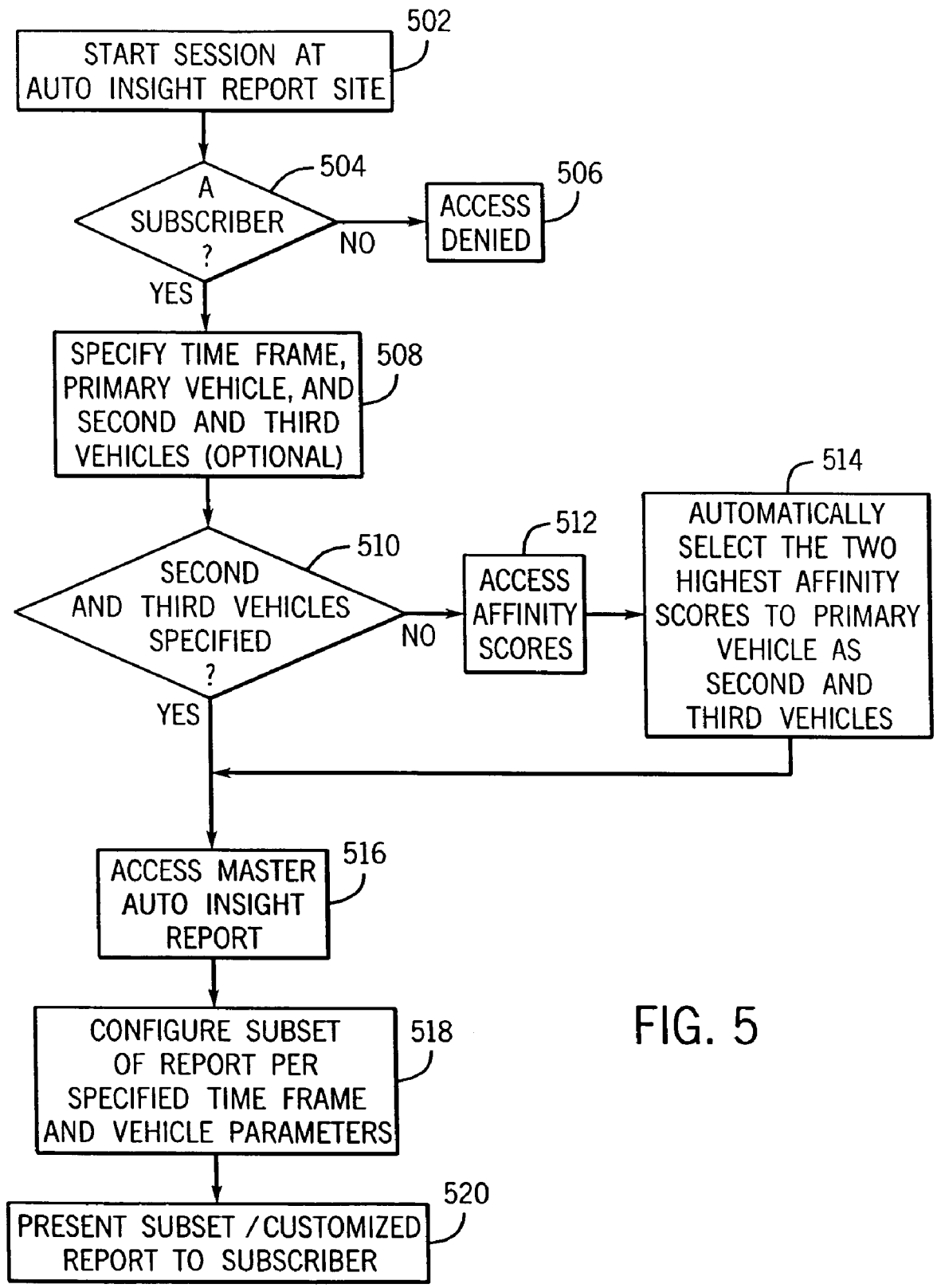
FIG. 5 is a flowchart illustrating a subscriber accessing an auto insight report site.

Referring to FIG. 5, there is shown one embodiment of a flowchart for obtaining a customized auto insight report. The flowchart includes a start session block 502, a subscriber check block 504, an access denied block 406, a subscriber specification block 508, a check block 510, an access affinity scores block 512, an auto pick block 514, an access master auto insight report block 516, a generate customized report block 518, and a present customized report block 520.

At the start block 502, a user starts a session at the auto insight report site. The auto insight report site may be a website accessible via the Internet.

After the user starts a session, the user is required to log in to verify that he/she is a paid subscriber (at block 504). If a proper log in and password are not provided, further access to the site is denied at the block 506. If proper log-in and password have been provided, then the user (who is now an identified subscriber) is permitted to navigate within the site.

Subscribers to the site are persons or entities interested in an interactive market research tool about potential auto shoppers; in which the sample size is approximately 300,000-1,000,000 potential auto shoppers per month and the data gathered is updated or refreshed on a monthly basis. The subscribers have access to cross-shopping and competitive information; demographic and geographic data of identified shoppers by auto make and model; and inferred interest profiles of these identified shoppers based on their other web-surfing activity in categories or areas such as music, movies, TV, shopping, and travel. Examples of subscribers include auto manufacturers, advertising agencies, and industrial design companies.

Figure 6:
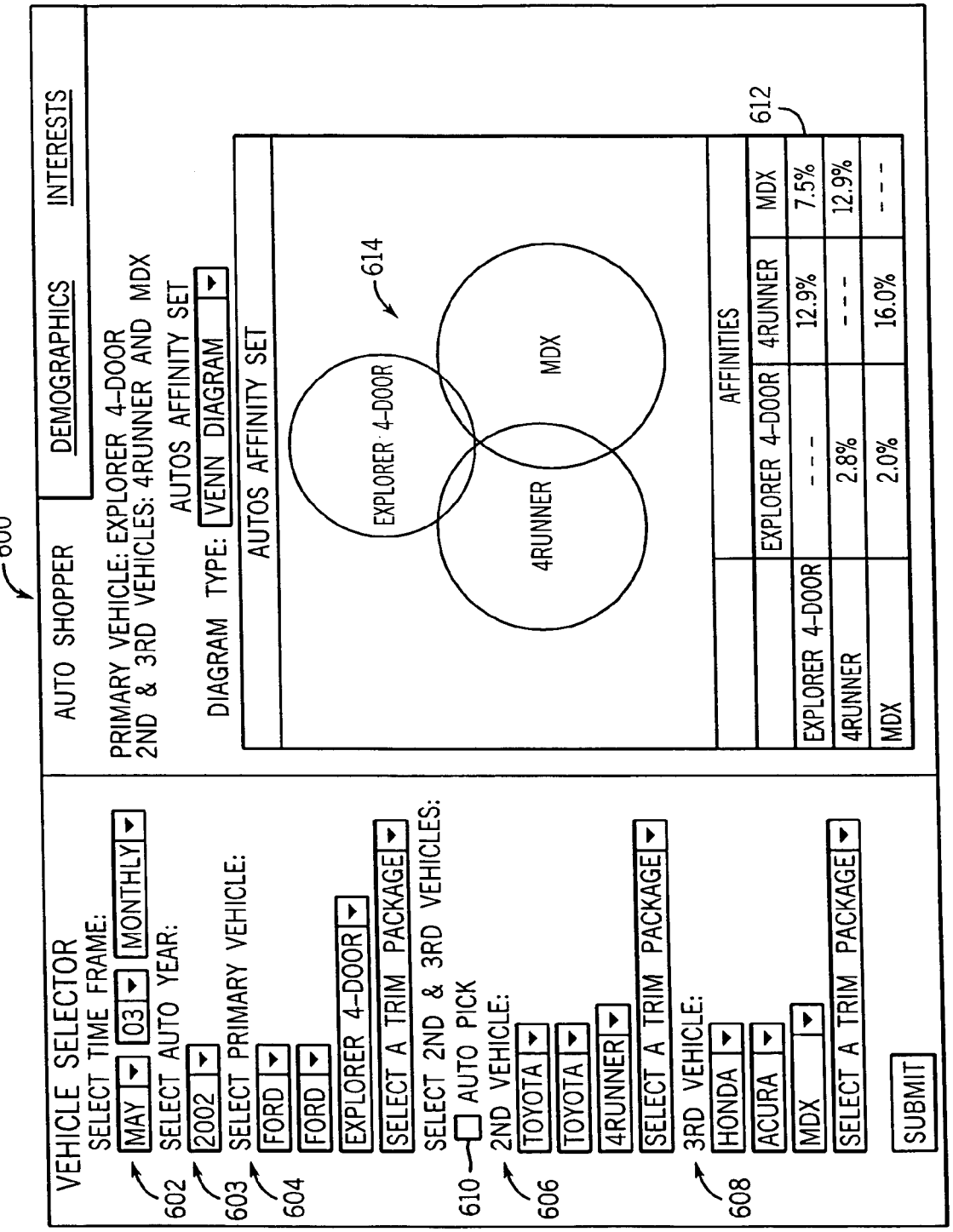
FIG. 6 is a screenshot of a page of a customized auto insight report.

Referring to FIG. 6, one embodiment of a screenshot 600 of a page of the site is shown. The subscriber specifies a time frame and the vehicles of interest (block 508). As shown in FIG. 6, a time frame icon 602 permits a month, year, and time period to be specified. For example, if May 2003 is selected in a quarterly mode, then the site will access data for the months of March, April, and May 2003. The subscriber further specifies a model year of a primary vehicle at an icon 603, a primary vehicle of interest at an icon 604, and a second and third vehicles of interest at icons 606, 608, respectively.

If no second and third vehicles are selected or the subscriber selects an auto pick option at an icon 610 (block 510), then the site automatically provides the two auto models with the highest affinities to the primary vehicle as the second and third vehicles of interest (blocks 512, 514). Alternatively, information relating to one or more than two vehicle models may be provided relative to the primary vehicle.

Once the subscriber is satisfied with the parameters, the subscriber submits these parameters to access a customized report. At the block 516, the master auto insight report for the time frame specified is accessed. The customized auto insight report provided to the subscriber is a subset of the master report, those portions that pertain to the primary, second, and third vehicles selected (block 518).

Finally, the customized report is presented to the subscriber (block 520). As shown in FIG. 6, the affinity information between the three selected auto models are presented. graphically as a Venn diagram 614 and quantitatively at a chart icon 612. The chart icon 612 shows the affinity score and the reverse affinity score between each pair of the selected vehicles. In the screenshot 600, the primary vehicle is a Ford Explorer 4 door, the second vehicle is a Toyota 4Runner, and the third vehicle is an Acura MDX.

Figure 7:
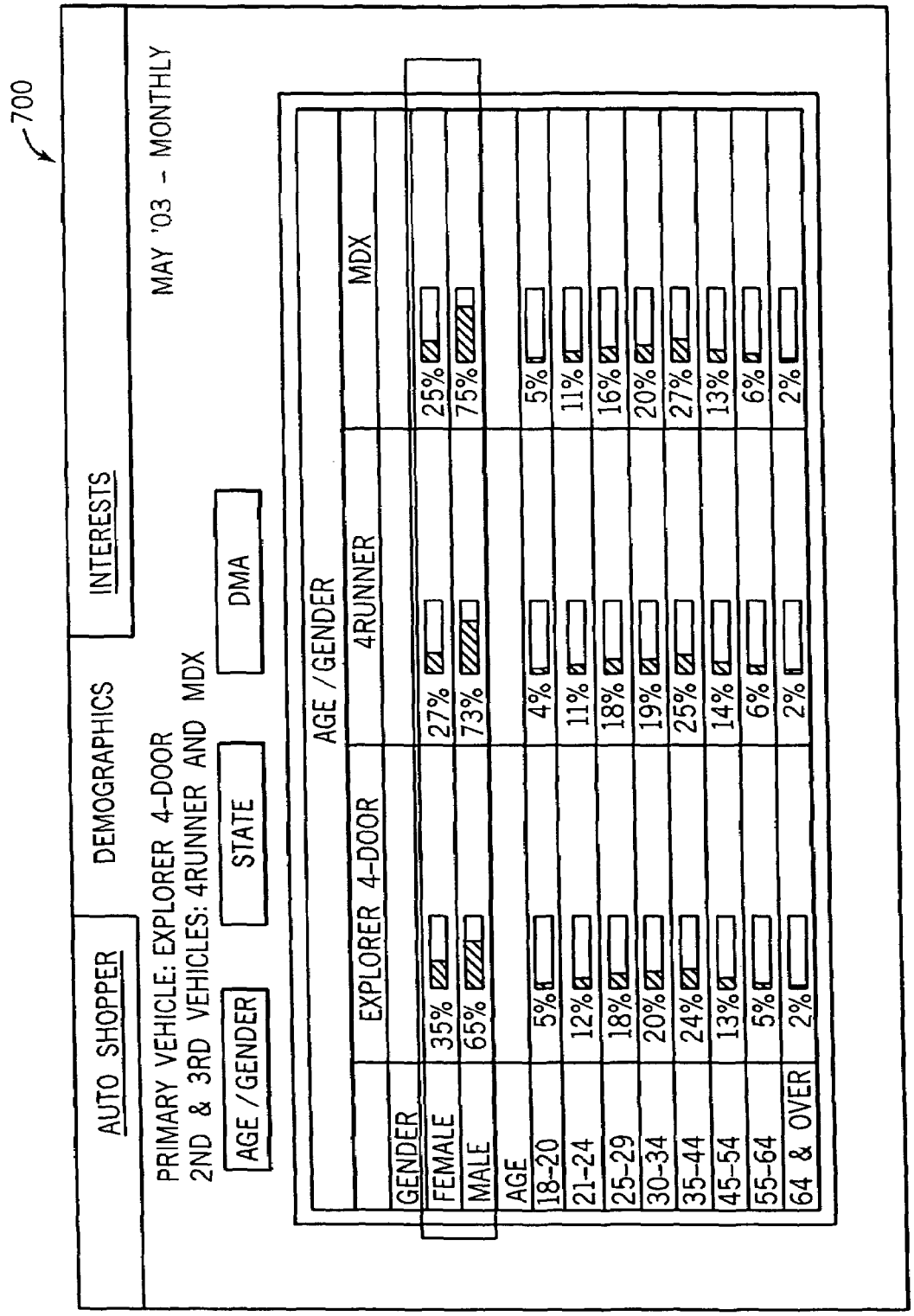
FIG. 7 is a screenshot of another page of the customized auto insight report of FIG. 6.

Referring FIG. 7, there is shown a screenshot 700 of another page of the customized report. Screenshot 700 illustrates the demographic data, and in particular the age and gender data, of those expressing interest in the three vehicles. Notice that the subscriber can also click on the "state" icon or the "DMA" (demographic metropolitan area) icon to view other demographic data.

Referring to FIG. 8, there is shown a screenshot 800 of another page of the customized report. The screenshot 800 shows an interest data for sports by the persons who expressed interest in the three vehicles. In the screenshot 800, shoppers of the Ford Explorer and the Acura MDX seem to have a stronger interest for winter sports than for the Toyota 4Runner (as highlighted). Under the "interest" tab, other categories of interest (music, TV, or travel) can also be viewed by the subscriber.

The customized report can also include other information, such as listings of auto models by highest to lowest affinity scores to the selected primary vehicle over consecutive time periods. In FIG. 9, such listings are shown at a screenshot 900.

In this manner, each subscriber can view and specify the various report parameters to obtain one or more customized reports. Even within the customized report, the subscriber can interactively view items of particular interest via the graphical interface.

In an alternate embodiment, the auto affinity data, demographic data, and interest data can be further refined to indicate the stage of the purchase cycle of the potential shoppers. The report presented to the subscriber can, for example, include a "ready to buy," "not ready to buy," and "midway ready to buy" groups, with each of the groups including the three types of data pertaining thereto. The user activity at the networked websites are further analyzed or categorized so that certain user authorities are regarded as "ready to buy" actions while others are "not ready to buy" actions, etc. For example, searching for a particular auto model may qualify as a "midway ready to buy" action. Looking at different color options for a particular auto model at the car product site may be a "ready to buy" action. Looking up a dealership may qualify as a "midway ready to buy" action.

In this manner, a system and method for providing customized auto insight reports is disclosed herein. A subscription service for the customized auto insight reports provides access to an easy-to-use user interface and a variety of marketing and profiling information, including auto affinity data, demographic data, and interest data. By tapping into the online activities of hundreds of thousands of users of certain websites, and analyzing and collating these activities into meaningful format, a pre-sale marketing research tool for automobiles is provided. Each auto insight report provides understanding of people who are shopping for a specific vehicle or competitors' vehicles, the cross-shopping behavior of these people, and demographic and behavioral information about such consumers with interest in the specific vehicles.

From the foregoing, it will be appreciated that specific embodiments of the invention have been described herein for purposes of illustration, but that various modifications may be made without deviating from the spirit and scope of the invention. For example, although four interest categories are shown in the auto insight report, other interest categories may be monitored. Accordingly, the invention is not limited except as by the appended claims.

What is claimed is:

1. A computer implemented method of generating information on peoples' interest in different types of automobiles, the method comprising:

monitoring, using a server, computer user navigation of a multiplicity of users to identify indications of interest in specific automobile models by such monitored users;

producing, using the server, affinity data that indicate measures of respective paired associations between respective pairs of specific automobile models based upon at least a prescribed number of monitored users having indicated interest in the respective pairs of specific automobile models, wherein the affinity data includes a first measure of paired association of a first specific automobile model to a second specific automobile model and a second measure of paired association of the second specific automobile model to the first specific automobile model;

monitoring, using the server, computer user searches of a multiplicity of users to identify categories of information of interest to the monitored users;

correlating, using the server, categories of information with identified indications of interest in specific automobile models;

obtaining, using the server, demographic information concerning the multiplicity of monitored users;

correlating, using the server, demographic information with identified indications of interest in specific automobile models;

receiving, using the server, a user request for market information about at least one automobile model identified by a user making the request;

using the affinity data, by the server, to generate a measure of paired association between the at least one user identified automobile model and at least one other automobile model;

using the correlated categories, by the server, to identify at least one category correlated with the at least one user identified automobile model; and using the correlated demographic information, by the server, to identify demographic information correlated with the at least one user identified automobile model.

2. The computer implemented method of claim 1, wherein the at least one other automobile model is identified by the user making the request.

3. The computer implemented method of claim 1, wherein monitoring computer user navigation includes monitoring computer user searches of the multiplicity of users.

4. The computer implemented method of claim 1, further comprising:
uniquely identifying each of the multiplicity of users.

5. The computer implemented method of claim 4, wherein uniquely identifying each of the multiplicity of users includes registering each of the multiplicity of users.

6. A system for generating information on peoples' interest in different automobile models, the system comprising:
means for monitoring computer use of a plurality of users to identify indication of interest in specific automobile models by such monitored users;
means for monitoring computer user searches by the monitored users to identify categories of information of interest to the monitored users;
means for obtaining demographic information concerning the monitored users;
means for generating affinity data, demographic data, and interest data from the identified indications of interest in specific automobile models, identified categories of information of interest, and demographic information, wherein the affinity data comprises a first measure of paired association of a first specific automobile model to a second specific automobile model and a second measure of paired association of the second specific automobile model to the first specific automobile model; and
means for requesting automobile insight information about at least one automobile model, wherein the at least one automobile model is specified by a user interfacing with the means for requesting.

7. The system of claim 6, further comprising:
a server in communication with the means for generating and configured to correlate categories of information with identified indications of interest in specific automobile models.

8. The system of claim 6, further comprising:
a server in communication with the means for generating and configured to correlate demographic information with identified indications of interest in specific automobile models.

9. The system of claim 6, wherein the affinity data comprises measurements of respective paired associations between respective pairs of specific automobile models based on their both having been indicated to be of interest by at least the monitored users.

10. The system of claim 6, further comprising:
means for generating a measure of paired association between the at least one user identified automobile model and at least one other automobile model.

11. The system of claim 6, wherein the means for requesting automobile insight information includes means for requesting automobile insight information about a first automobile model, wherein the second automobile model is specified by the user.

12. A system, comprising:
a first server configured to generate a measure of paired association between an at least one automobile model and at least one other automobile model, at least one category information relating to the at least one automobile model, and demographic information relating to the at least one automobile model, wherein the at least one other automobile model comprises a first automobile model and a second automobile model, wherein the first automobile model, the second automobile model, and the at least one automobile model being different from each other, and wherein the at least one other automobile model is automatically selected by the first server when the user request for market information does not specify the at least one other automobile model;
a device in communication with the first server and configured to receive a user request for market information about the at least one automobile model and to present the market information from the first server; and
a database in communication with the first server and configured to store affinity data indicative of measures of respective paired associations between respective pairs of specific automobile models based on both of the specific automobile models having been indicated as being of interest by at least a prescribed number of monitored users, at least one category information for each of the specific automobile models, and demographic information for each of the specific automobile models.

13. The system of claim 12, further comprising:
at least one monitoring device in communication with the first server and configured to monitor computer use of a plurality of users over a prescribed period of time to identify indications of interest in the specific automobile models by the at least prescribed number of monitored users; and
a second server in communication with the database and configured to generate the affinity data based on the identified indications of interest in the specific automobile models at the at least one monitoring device.

14. The system of claim 12, wherein the user request for market information includes a request for a first automobile model, wherein the first automobile model, the at least one automobile model, and at least one other automobile model are different from each other.

15. The system of claim 12, wherein the market information includes the measure of paired association, at least one category information, and demographic information for each of the at least one automobile model, the first automobile model, and the second automobile model.

16. The system of claim 12, wherein the at least one category information comprises URL addresses of websites predetermined to be of a certain category.

17. The system of claim 12, wherein the at least one monitoring device is further configured to monitor computer user searches of the plurality of users to identify categories of information of interest to the at least prescribed number of monitored users, and obtain demographic information about the at least prescribed number of monitored users.

18. A computer-readable medium containing data structure for use by a remotely located computing device, the data structure comprising:

at least one record stored at a server computer comprising a specific automobile model identifier, a first measure of paired association of an automobile model represented by the specific automobile model identifier to at least one other automobile model, a second measure of paired association of the at least one other automobile model to the automobile model, at least one first category information for a first category correlated to the automobile model, and at least one demographic information correlated to the automobile model, wherein the first and second measures of paired association, at least one first category information, and at least one demographic information are obtained from monitoring a plurality of users at computing devices.

19. The computer-readable medium of claim 18, wherein the at least one record further comprises an affinity order between the automobile model and the at least one other automobile model.

20. The computer-readable medium of claim 18, wherein the at least one record further comprises at least one second category information of a second category correlated to the automobile model, wherein the first and second categories are different from each other.

* * * * *